United States Patent [19]

Wobermin et al.

[11] Patent Number: 5,153,937
[45] Date of Patent: Oct. 6, 1992

[54] SYSTEM FOR GENERATING ANTI-ALIASED VIDEO SIGNAL

[75] Inventors: James A. Wobermin, Arvada; Kendall N. Fuhrman, Evergreen, both of Colo.

[73] Assignee: Ampex Corporation, Redwood City, Calif.

[21] Appl. No.: 497,471

[22] Filed: Mar. 22, 1990

Related U.S. Application Data

[63] Continuation-in-part of Ser. No. 411,446, Sep. 22, 1989, abandoned.

[51] Int. Cl.$^5$ ............................................. G06F 15/62
[52] U.S. Cl. .................................................... 395/131
[58] Field of Search ............... 364/518, 521; 340/728; 395/131, 132

[56] References Cited

U.S. PATENT DOCUMENTS

| | | | |
|---|---|---|---|
| 4,704,605 | 11/1987 | Edelson | 340/728 |
| 4,780,711 | 10/1988 | Doumas | 340/728 |
| 5,020,002 | 5/1991 | Malachowsky | 364/518 |

OTHER PUBLICATIONS

Dyer, Scott et al., "a Vectorized Scan-Line Z-Buffer Rendering Algorithm", IEEE CG & A, Jul., 1987.
Smith, Athur A. et al., "A New Dimension in Broadcast Graphics", SMPTE Journal, Sep. 1982.
Turkowski, Kenneth, "Anti-Aliasing Through The Use Of Coordinate Transformations", ACM Transactions on Graphics, vol. 1, No. 3, Jul. 1982.
Weinstock, Neal, "CGI:I: An Introduction To The Technology", E-ITV, Apr., 1987.
Wood, John F. et al., "New Developments in Electronic Character Generation", SMPTE Journal, May 1986.

Primary Examiner—Gary V. Harkcom
Assistant Examiner—Mark K. Zimmerman
Attorney, Agent, or Firm—John S. Bell; Richard J. Roddy

[57] ABSTRACT

A symbol generator for providing an anti-aliased video data signal and maintaining jagged edge anti-aliasing during symbol movement. The symbol generator determines the proportions of raster display locations or picture elements crossed by symbol boundaries that are on opposite sides of those boundaries, and applies those proportions to provide color values for those picture elements that are appropriate mixtures of the colors on opposite sides of the boundary. The boundary generator is comprised of a series of processing stages that regenerate a complete video color signal for each display field. Elements for determining proportions boundary display locations and providing anti-aliasing are distributed between the different processing stages.

3 Claims, 12 Drawing Sheets

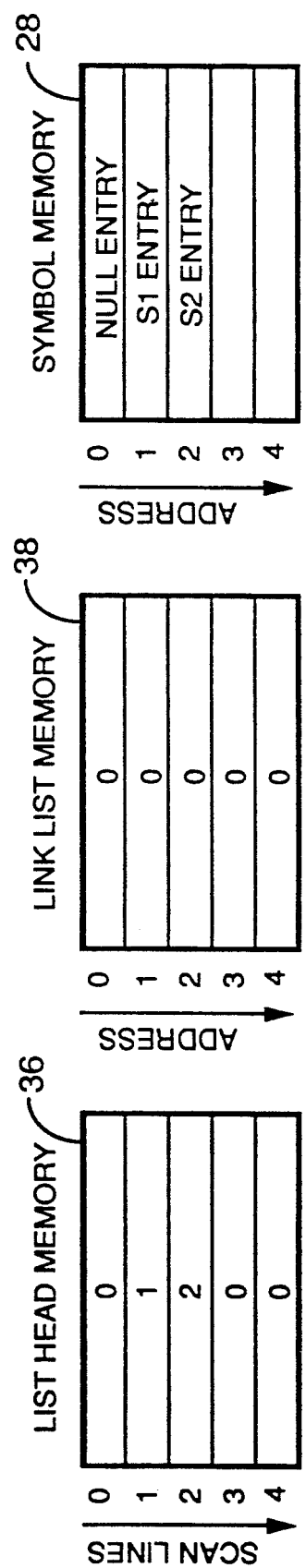

| VERTICAL SORTER BOUNDARY POINTERS | |
|---|---|
| 1st | 1 |
| 2nd | 2 |
| 3rd | 7 |
| 4th | 3 |
| 5th | 8 |
| --- | --- |

FIG. 9

| | LINE INDEX |
|---|---|
| 1 | 1 |
| 2 | 2 |
| 3 | 4 |
| 4 | 6 |
| 5 | 8 |
| 6 | 10 |
| 7 | 11 |
| 8 | 12 |
| 9 | 13 |
| 10 | 14 |

INTERSECTION LIST

| | | X COORDS | CONTOUR |
|---|---|---|---|
| 1 | $S_1L_0$ | (0,3) | 1 |
| 2 | $S_1L_1$ | (0,3) | 1 |
| 3 | $S_1L_1$ | (1,2) | 2 |
| 4 | $S_1L_2$ | (0,3) | 1 |
| 5 | $S_1L_2$ | (1,2) | 2 |
| 6 | $S_1L_3$ | (0,3) | 1 |
| 7 | $S_1L_3$ | (1,2) | 2 |
| 8 | $S_1L_4$ | (0,3) | 1 |
| 9 | $S_1L_4$ | (1,2) | 2 |
| 10 | $S_1L_5$ | (0,3) | 1 |
| 11 | $S_2L_0$ | (0,4) | 1 |
| 12 | $S_2L_1$ | (0,6) | 1 |
| 13 | $S_2L_3$ | (0,6) | 1 |
| 14 | $S_2L_4$ | (0,4) | 1 |

SYSTEM FOR GENERATING ANTI-ALIASED VIDEO SIGNAL

CROSS REFERENCE TO RELATED APPLICATIONS

This application is a continuation-in-part of copending patent application Ser. No. 07/411,446 filed Sep. 22, 1989, now abandoned.

This application is also related (i) to pending application Ser. No. 07/585,779 filed Sep. 20, 1990 and (ii) to pending application Ser. No. 07/497,957 filed Mar. 22, 1990, which is a continuation-in-part of patent application Ser. No. 07/411,076 filed Sep. 22, 1989, now abandoned.

BACKGROUND OF THE INVENTION

This invention relates to special effects video devices such as character generators used in television studios and broadcast facilities to generate video signals that represent alpha numeric characters and other symbols to be presented in a television display. More specifically, the invention relates to systems for generating video signals that are jagged-edge anti-aliased. Jagged edged symbol boundaries caused by sharp transitions between adjacent elements of a video display raster can be eliminated or anti-aliased by providing the portions of the video data or color signal that correspond to discrete raster display locations that are crossed by symbol boundaries with color values that are mixtures of the colors on opposite sides of that boundary. But, a very large amount of data must be processed at a very high rate to provide and maintain anti-aliasing, particularly during symbol movement or animation.

The popular design approach for a wide range of character generators utilizes frame buffers to manipulate symbols or update video signals. Frame buffer systems achieve animation by moving blocks of data representing portions of a video image to be modified, formulating vectors, and filling memory blocks of the frame buffers with desired display patterns. They require complex electronics to identify the portion of a display to be modified and manipulate blocks within a frame buffer representing those portions of the image. Approximately 33 nanoseconds (ns) are available and required to update a complete non-moving image in real time video. If significant motion of symbols (that is, text, characters, logos and other objects) occurs, the time for recalculation of an entire frame exceeds the 33 ns period. To achieve motion a compromise must be made, which usually involves dropping some or all anti-aliasing.

There have been prior efforts to design a pipeline system that would regenerate a complete video signal representing all portions of an image each field or frame and thereby avoid the requirement of frame buffer systems to identify particular portions of a video signal or blocks of data to be modified from one field to the next. The prior effects have included use of symbol boundaries to reduce the amount of data from that which must be processed in a frame buffer system. They have not sufficiently reduced the number of calculations or amount of data that must be processed to maintain anti-aliasing, or sufficiently increased the speed of the required calculations to provide a practical successful system. The capability of both frame buffer and prior pipeline designs has been limited with respect to dynamic display characteristics, the processing speed and amount of data required to be handled for anti-aliasing and the interrelationship between anti-aliasing, and the other capabilities of the system.

SUMMARY OF THE INVENTION

The symbol generator of this invention provides an improved system for generating anti-aliased video signals in real time that maintains anti-aliasing during symbol animation. One aspect of this invention involves determining the proportions, for example, as percentages, of raster display locations crossed by symbol boundaries that are on opposite sides of those boundaries. These percentages are applied to provide the portions of the output video data signal that represent symbol boundaries with values that are appropriate mixtures of the values of the portions of the video signal that represent areas on entirely opposite sides of the boundary. Another aspect of this invention involves distribution of elements or functions for providing anti-aliasing along a pipeline series of processing stages that regenerate the complete video data output signal for each field. The processing stages regenerate and sort address signals that determine the value of video data signals output from look-up memories for all boundary points for each field. The sorted sequence of address signals determines the position of symbol boundaries in the output video signal provided by the symbol generator.

The symbol generator described herein includes a first stage for calculating boundary coordinates and other selected parameters for symbols to be included in a video signal independent of the position of the symbols in the video data signal or image represented by that signal. The symbol generator also includes a series of additional stages for receiving both calculated values and operator selected values and providing further processing to produce a video data signal. These stages comprise a vertical sorter stage, a boundary generator stage, a horizontal sorter stage, a filler stage and a mixer stage. The vertical sorter stage sorts calculated boundary coordinate values according to vertical or scan line position in the display represented by video data signal. The boundary generator stage determines the x coordinate positions of vertically sorted boundary points in the video image, and also provides an appropriate preselected address signal for each boundary point that identifies a color value pre-loaded into a look-up memory (color palette). The horizontal sorter stage sorts boundary points for each raster scan line according to horizontal position along that scan line. The filler stage determines the color value filled into the video data signal by controlling transmission of signals to the color palettes and mixer. The mixer stage includes two color palettes that provide video data signals or color signals having RGB and key values that are determined by the values of read-out address signals provided to the respective color palette during operation. The mixer stage also includes a mixer for combining signals provided by two color palettes to provide an output signal.

Steps for determining the slopes of boundaries across raster scan lines are divided between the first calculating stage and the boundary generator stage. The first stage for performing initial calculations, which is embodied in a cpu microprocessor in the system described herein, is adapted to calculate the area or proportions of the first and last picture elements along each scan line intercepted by each boundary, and the width of each boundary crossing. The boundary generator stage receives these values and uses them to determine an average incremental value or change in the areas of consecutive pixels on opposite sides of the boundary. Steps for determining the color values of boundaries are divided between the filler stage and mixer stage. The filler stage includes color select logic that provides address signals for boundary pixels that point to color values on opposite sides of the boundary, and a mix generator that applies the start area, width, and incremental area provided by the boundary generator to provide percentage area signals having values that equal the proportions of each pixel crossed by a symbol boundary on opposite sides of the boundary. The mixer stage multiplies RGB video signals for colors on opposite sides of the boundary by these percentages and combines the multiplied signals to provide a summed RGB output signal which has a value for pixels intercepted by a boundary that is intermediate the color values on opposite sides of the to boundary. This architecture enables the symbol generator of this invention to provide and maintain anti-aliasing with less processing during symbol animation and a more straight forward processing approach that can be achieved at a faster rate than prior art systems.

BRIEF DESCRIPTION OF THE DRAWINGS

FIGS. 5, 6 and 7 illustrate the sorting memories, called respectively a list head memory, a link list memory, and a symbol memory, of the vertical sorter;

FIGS. 9, 10 and 11 illustrate data storage structure in a line index memory and a intersection list memory of the boundary generator as well as an addressing sequence to those memories as outputted from the vertical sorter;

DETAILED DESCRIPTION

Figure 1:
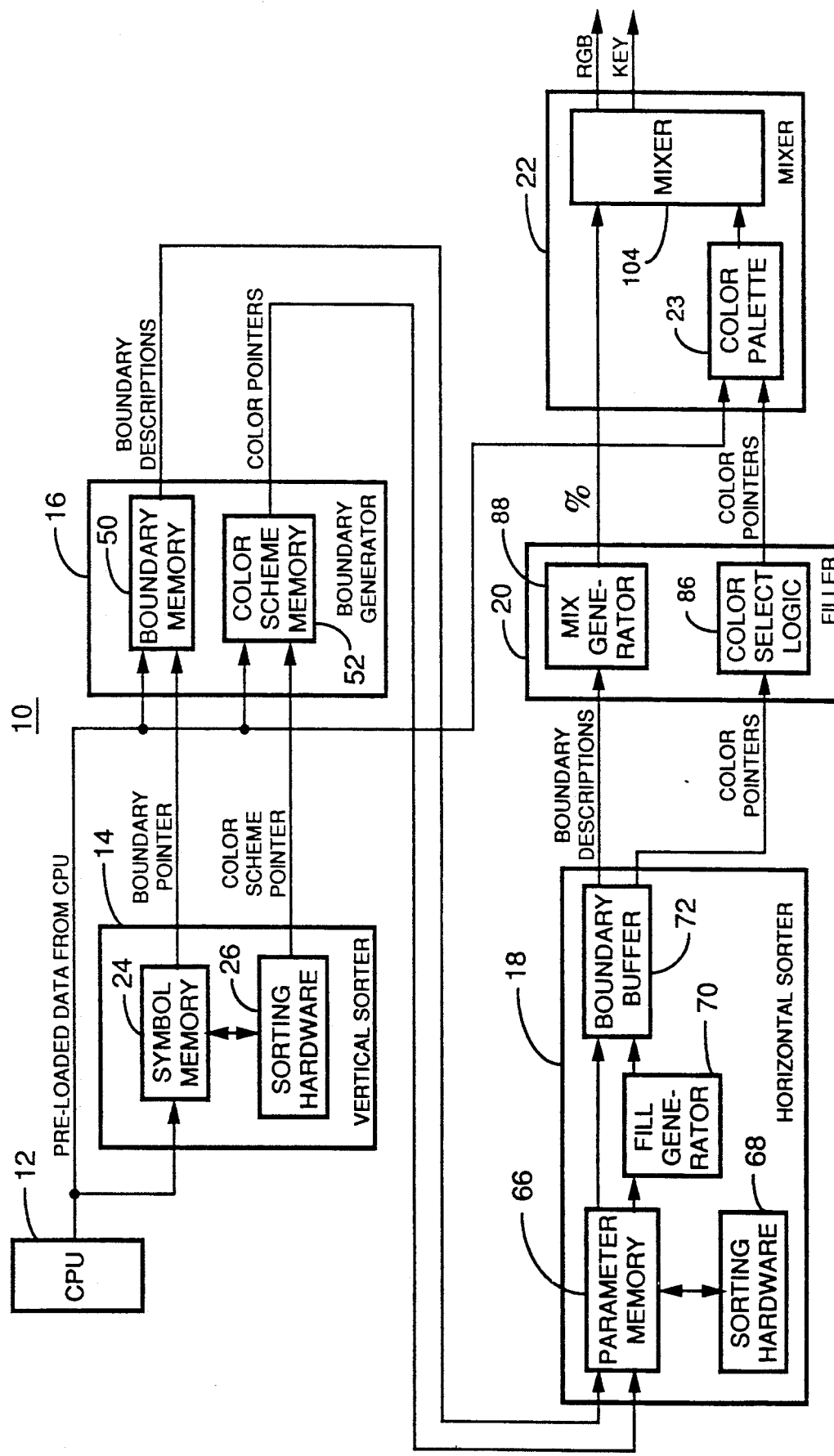
FIG. 1 is a block level diagram of a symbol generator that incorporates the pipeline architecture of this invention.

FIG. 1 illustrates a symbol generator 10 for providing a video signal representing symbols selected by an operator, who wants the symbols in desired positions in an output display. Generator 10 is comprises of a cpu 12 for generating the line segments or coordinate points of the boundaries of selected symbols, a vertical sorter 14 for sorting symbols according to y axis or scan line position in a display, a boundary generator 16 for providing the x axes display coordinates or positions in a desired display of the boundary coordinate points calculated by the cpu, a horizontal sorter 18 for sorting boundary coordinates in horizontal or order along scan lines of a display, a filler 20 for providing output signals that determine the color values filled into the video signal, and a mixer 22 for providing portions of the video signal representing symbol boundaries with color values that are appropriate mixtures of the colors on opposite sides of those boundaries.

CPU—Calculation of Symbol Coordinates

Figure 18:
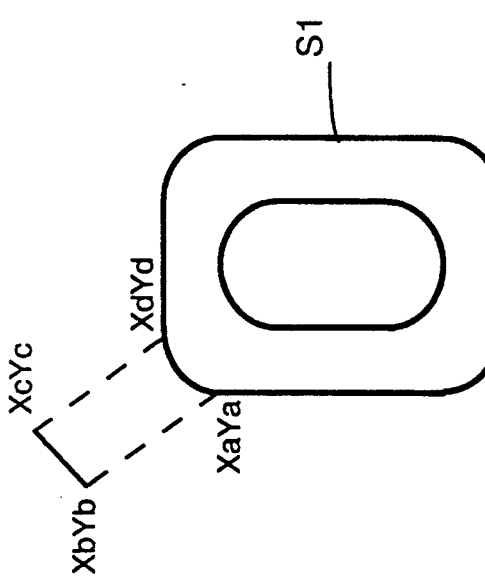
Figure 19:
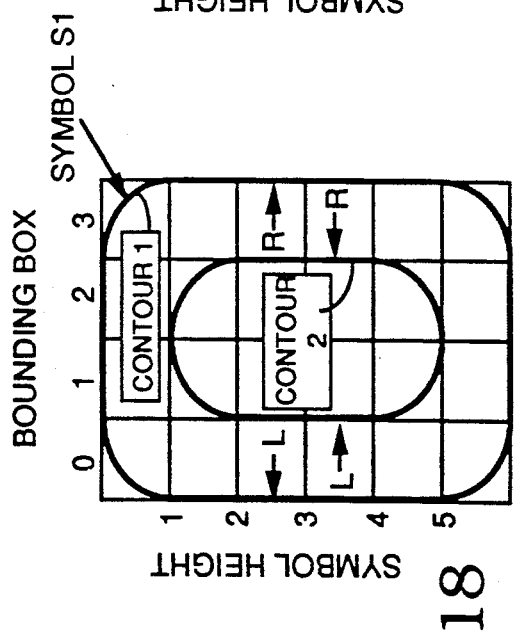

The cpu is comprised of a general purpose microprocessor programmed to calculate the coordinates of the line segments or points that comprise the boundaries of selected symbols from equations that describe the shape of those boundaries. For letters and numbers, the coordinates are generally called font coordinates and the equations are called typeface equations. Examples of such equations include Bezier curve equations, conic curve equations and linear or line equations (vectors). FIGS. 16, 17, 18 and 19 illustrate an example of an initial calculation of the boundaries of the symbols shown in FIG. 2 and illustrate calculation of boundary coordinates of two symbols S1 and S2 using Bezier equations. Specific curves or boundaries are determined by a set of 4 control points, two of which identify the start and end points of the curve, and 2 control points that characterize the curve between those end points. The coordinates of points along a curve or boundary are calculated by setting these control points to appropriate values and varying the parameter t in the following Bezier equations between (t=) 0 for the start point and (t=) 1 for the end point $$X = x_a(1-t)^3 + 3x_b(1-t)^2 t + 3x_c t^2(1-t) + x_d t^3$$

$$Y = y_a(1-t)^3 + 3y_b(1-t)^2 t + 3y_c t^2(1-t) + y_d t^2$$

where:
$(x_a, y_a)$ = start point of the curve
$(x_b, y_b), (x_c, y_c)$ = control points
$(x_d, y_d)$ = end point of the curve $0 \leq t \leq 1$ The line segments or boundary coordinates calculated by the CPU are specific to each symbol and independent of the intended location of the symbol in a display. These calculated coordinates are referred to herein as bounding box coordinates. The resolution of the bounding box coordinate system in which coordinate values are calculated corresponds to the resolution of a television display. The x integers define width in units corresponding to the spacing between the discrete display locations disposed along the parallel lines of a television display raster. The y integers define height in units that correspond to the spacing between scan lines of a display. FIGS. 18 and 19 show bounding box coordinates in exaggerated proportion for illustration. Each square represents an individual picture element or pixel of a display. The term pixel is used in this application to refer to the discrete display locations of a television display screen or raster. In appropriate context the term also refers to the portion or section of a video color signal representing the output to be provided from a raster point or display location.

Figure 21:
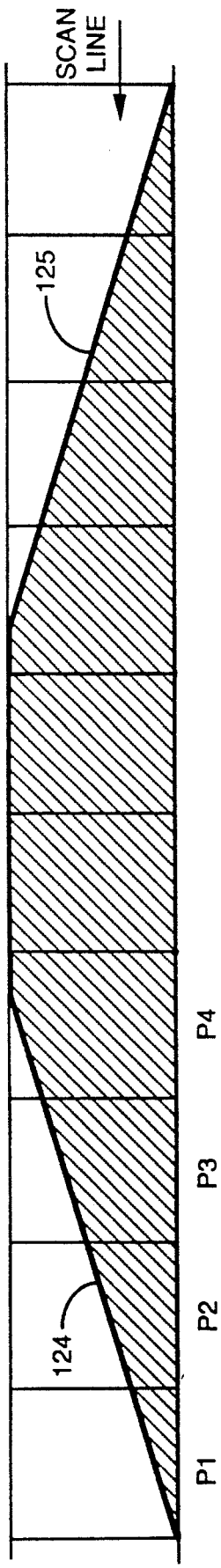
FIGS. 21 and 22 illustrate an example of a calculation of the slope of a boundary in crossing a scan line and the percentages or proportions of different raster elements crossed by a boundary disposed on opposite sides of a boundary.
Figure 22:
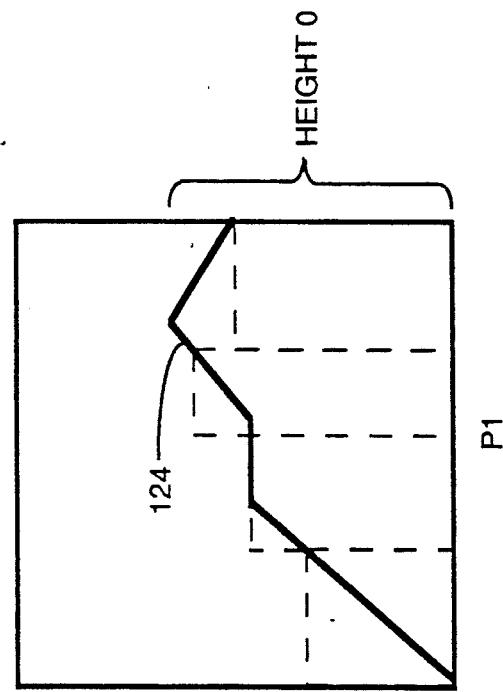

Further calculations and comparisons provided by cpu 12 can be best appreciated by consideration of FIGS. 21 and 22. FIG. 21 shows a left boundary 124 that traverses 4 pixels P1-P4 in crossing a raster scan line and a right boundary 125 of the same symbol as boundary 124 that also intercepts four pixels in crossing the scan line. FIG. 22 shows boundary 124 across pixel P1 in higher resolution than FIG. 21. As is illustrate by FIG. 22 the cpu calculates the line segments or coordinate points that define symbol boundaries with sufficient resolution to provide a number of different boundary points across each raster display element. The cpu retains and compares boundary coordinates provided by solving the line equations to determine the width of each boundary crossing, or number of consecutive pixels traversed by each boundary along each scan line. The cpu then calculates the portions of the first and last pixels of each boundary crossing that are on the right side of the boundary. As illustrated by FIG. 22, an adequate approximation of the areas or portions of a display element on opposite sides of the boundary is provided by a quick form of Newton's method. The height of the scan line 124 is taken at regularly spaced intervals as shown by the four horizontal dotted lines. The portion of a pixel P1 to the right of the boundary, which for boundary 124 is the shaded symbol area, is provided by calculating the areas represented by the dotted rectangles defined by the height determinations. The area for the last pixel crossed by boundary 124 can be calculated according to the same procedure as for pixel P1. Or, for boundaries such as illustrated in FIG. 21 in which the next pixel to the right of the pixel at which the boundary leaves the scan line is entirely within the symbol contour or background area, appropriate values for use by the boundary generator for further determination of slope can be provided by increasing the width by 1 and assigning a final pixel area value of 1 (100%) without additional calculation. Calculations for right boundary 125 are similar to those for left boundary 124 except that since the areas calculated for all boundaries are the portions of intercepted pixels to the right of the boundary, the shaded portion of pixel beneath the boundary line is subtracted from the total area or 1 to provide the appropriate area or percentage value.

CPU—Classification and Sorting

Figure 16:
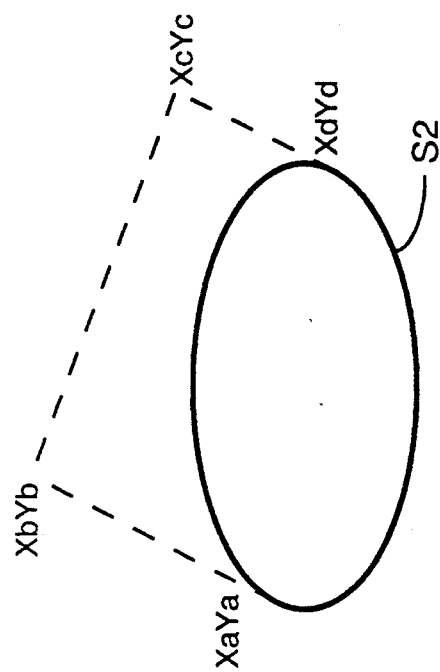
FIGS. 16, 17, 18 and 19 illustrate an example of an initial calculation of the boundaries of the symbols shown in FIG. 2.
Figure 17:
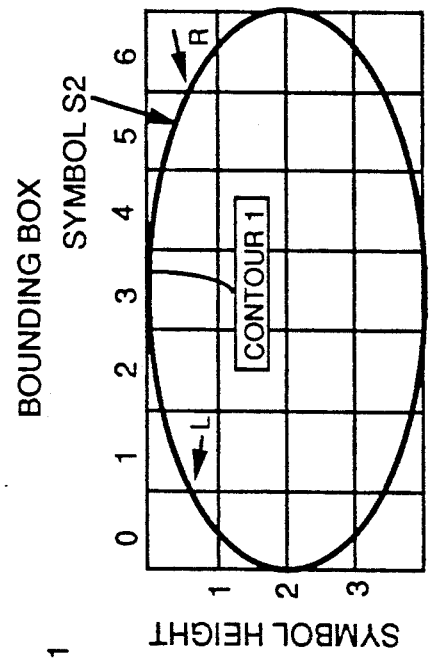

In addition to calculating symbol coordinates and selected boundary description values relating to antialiasing, the cpu also classifies and sorts boundary coordinates according to pre-programmed logic. With respect to classification, the cpu assigns a reference number to each boundary line of a symbol. This number applies to the complete boundary line or outline defined by the line and is therefore referred to herein as a contour number. Symbol S1 shown in FIG. 2 and in more detail in FIGS. 16 and 18 includes two closed contour lines which are given contour numbers 1 and 2. The boundary or contour numbers are specific to each symbol. Symbol S2 shown in FIG. 2 and in more detail in FIGS. 17 and 19 is defined by one closed contour boundary line. This contour is assigned a contour number of 1. The contour number is used together with an operator's selected color scheme for a symbol to generate color address numbers which determine the color values of the video signal(s) provided by the color palette 23 of the mixer 22 for the portions of the symbols or areas within each boundary.

Figure 20:
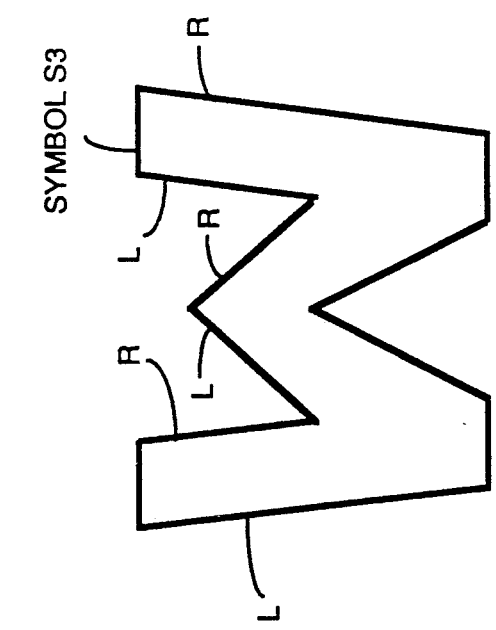
FIG. 20 illustrates a symbol contour having multiple left and right boundaries.

The cpu identifies sections or coordinates of each boundary as being either right or left, or in other words defining either a right or left edge of the area contained within the boundary. Edges are determined to be either left or right by reading the x coordinate value for each scan line. As shown by the "W" shaped symbol S3 in FIG. 20, one continuous boundary line or contour may have several different right sections and left sections. For each individual raster scan line the left most boundary along a scan line is a left boundary, the next a right, the next a left, and so forth. When a boundary line changes direction and leaves a scan line from the same side as it entered, the section to the left of the inflection point is classified as a left boundary and the segment to the right as a right boundary. The sides or edges of each closed contour boundary are determined to be either left or right without regard to any other boundary in the symbol. For example, the opposite side of the boundary contour 1 of Symbol S1 is defined as left or right in scanning along that boundary without regard to the presence of boundary contour 2 within the area defined by boundary 1. Left/right boundaries are collected into boundary pairs with each pair belonging to the same contour.

Figure 2:
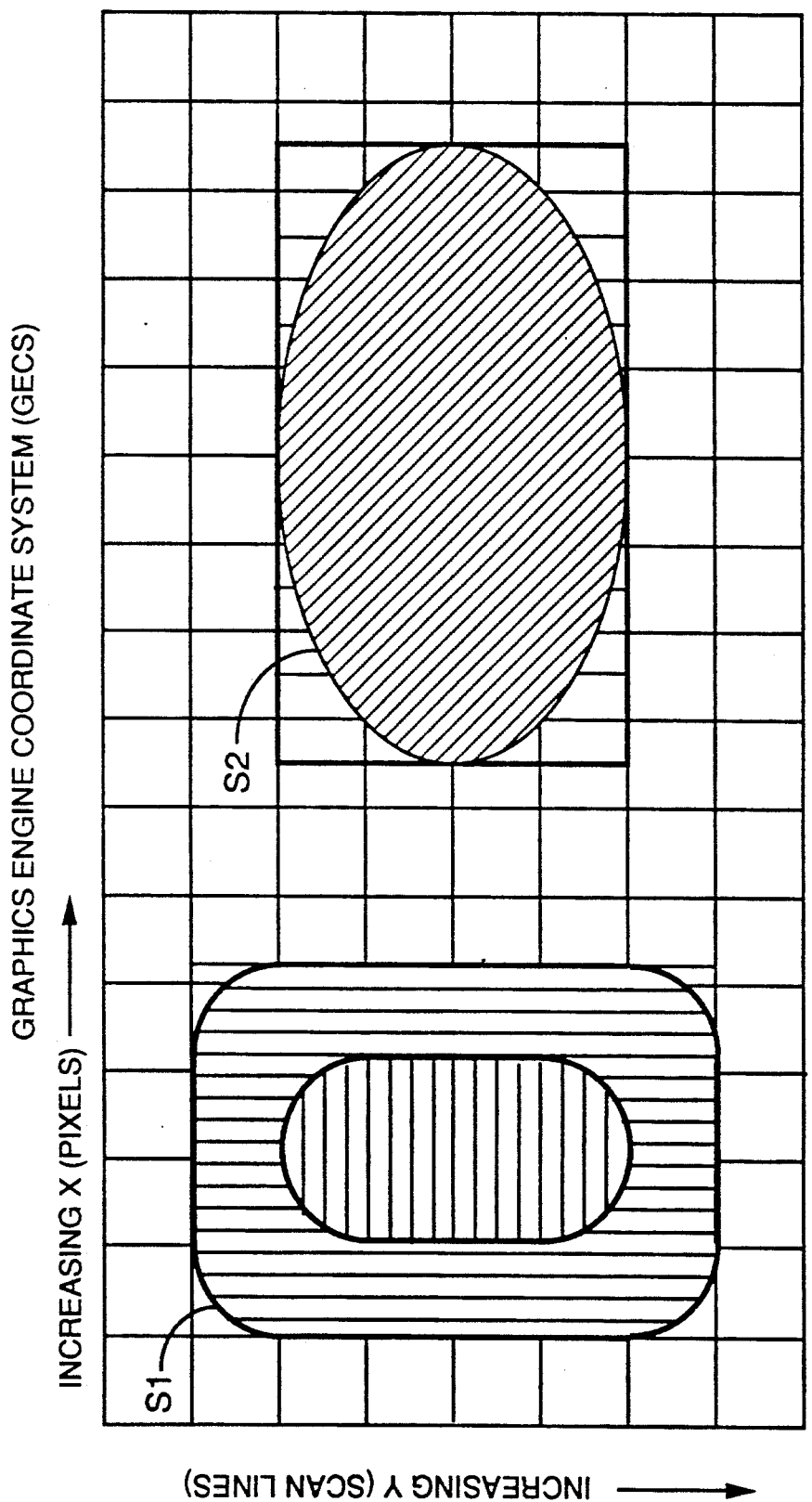
FIG. 2 is an illustration of a television display of two symbols.

When a boundary is preselected to define an opening or hole in a symbol to be displayed so that the viewer will observe the background behind that portion of a symbol, the left/right designation of the sides or edges of the contour is reversed. The letter "O", as shown in FIGS. 2, 16 and 18, is an example of this type symbol. If symbol S1 is to be a true letter "O" so that the background behind the "O" will be seen in contour area 2, the left side or edge (which is labeled L for left in FIG. 18) is designated right and the right side (labeled R for right in FIG. 18) is designated left for processing through the subsequent stages of the symbol generator 10. After the left/right designations are appropriately applied to hole cutting contours boundary pairs for these contours are collected and processed through the system the same as all other contours.

The cpu also sorts the calculated the line segments and boundary parameter values associated with those calculated line segments for each symbol in vertical or y axis order. The sort is accomplished by reading the y coordinate values of each of the line segments of a symbol. This vertical sort is specific for each symbol, independent of all other symbols and does not reflect other factors such as the position in a display at which an operator may chose to place the symbol. The sort does mix the contours of each individual symbol that contains more than one contour. That is, all values for all boundary line segments or boundaries of all contours of a symbol on one horizontal scan line are grouped together before listing any points on the next line. The parameters provided for each sorted left-right boundary pair include the contour number, the x coordinate or x bounding box pixel number for the left most pixel intercepted by each boundary, start and end areas or portions of the first and last pixels intercepted by each boundary that is on the right side of that boundary, and the width of each boundary. The cpu also provides the height of each symbol or total number of scan lines that cross that symbol.

CPU—Operator Selection of Display Parameters

In response to operator selection, the cpu provides the location or x and y coordinates of a reference point for each symbol in a desired raster display. This reference point location for each symbol identifies the position of the upper left hand corner or location of the top left bounding box pixel in a television display. More specifically, since the symbol generator 10 does not include a device for presenting a video display to a viewer but instead generates a video data signal for use by a display device, the reference point location signal determines the position or portion of the video data signal provided by symbol generator 10 that represents that symbol. The terms left and right are used herein according to standard convention in video technology with display raster scanning beginning at the upper left hand corner of a display screen and scanning from left and right across the screen along horizontal lines in sequence from the top to bottom. The value of the reference point is not restricted and may correspond to any point on a display raster either aligned with a pixel, or part way across or between pixels in either the x or y directions.

The cpu also provides an operator selected color scheme number for each symbol that is added to the contour numbers to provide color pointers or address numbers that determine the color value of the video signal to be provided by the symbol generator 10, and a number referred to hereinafter as symbol name that identifies an initial memory location or starting point in boundary generator 16 containing symbol parameters for that symbol. In a operation, the reference point location number determines the position in the output video data signal provided by the symbol generator 10 of signal information for that symbol, and thus the location of the symbol in an output display when the data signal is applied to a display device. The reference number is changed to move a symbol or cause a symbol to be in a different position in a subsequent frame. The color scheme number is varied to change the color of a symbol. The symbol name number is used in the vertical sorter 14 as described hereinafter to locate symbol parameters for each scan line during vertical sorting.

Vertical Sorter

Figure 3:
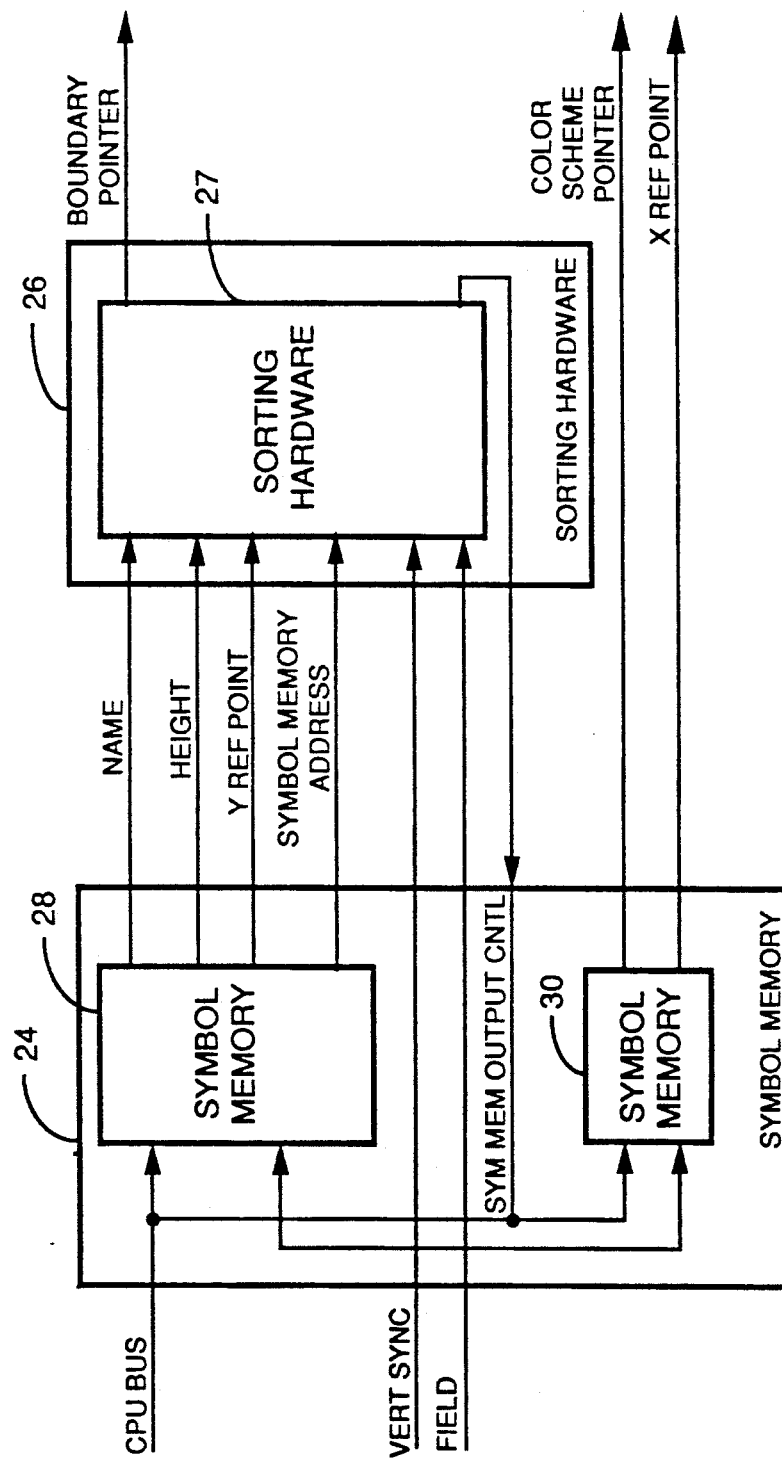
FIG. 3 is a block level diagram of the vertical sorter stage of the symbol generator of FIG. 1.

The vertical sorter 14 shown in FIGS. 1 and 3 is comprised of a symbol memory 24 for receiving selected parameters from the cpu 12 and sorting hardware 26 for using those parameters to provide vertical sorting by generating a sequence of memory addresses to locations in the boundary generator 16 for each scan line that cause the boundary generator to output the output parameters for symbols on that scan line. Symbol memory 24 is comprised of two memories or sets of registers 28 and 30. Memory 30 is an extension of memory 28. These memories are shown separately in FIG. 3 to facilitate description, as they receive different symbol parameters which are transmitted to different locations and used differently in generating a video output signal. Memory 28 receives the name, height and y coordinate of the display reference point for each symbol to be included in a display. Memory 30 receives the color scheme number and x coordinate of the reference point.

Figure 4:
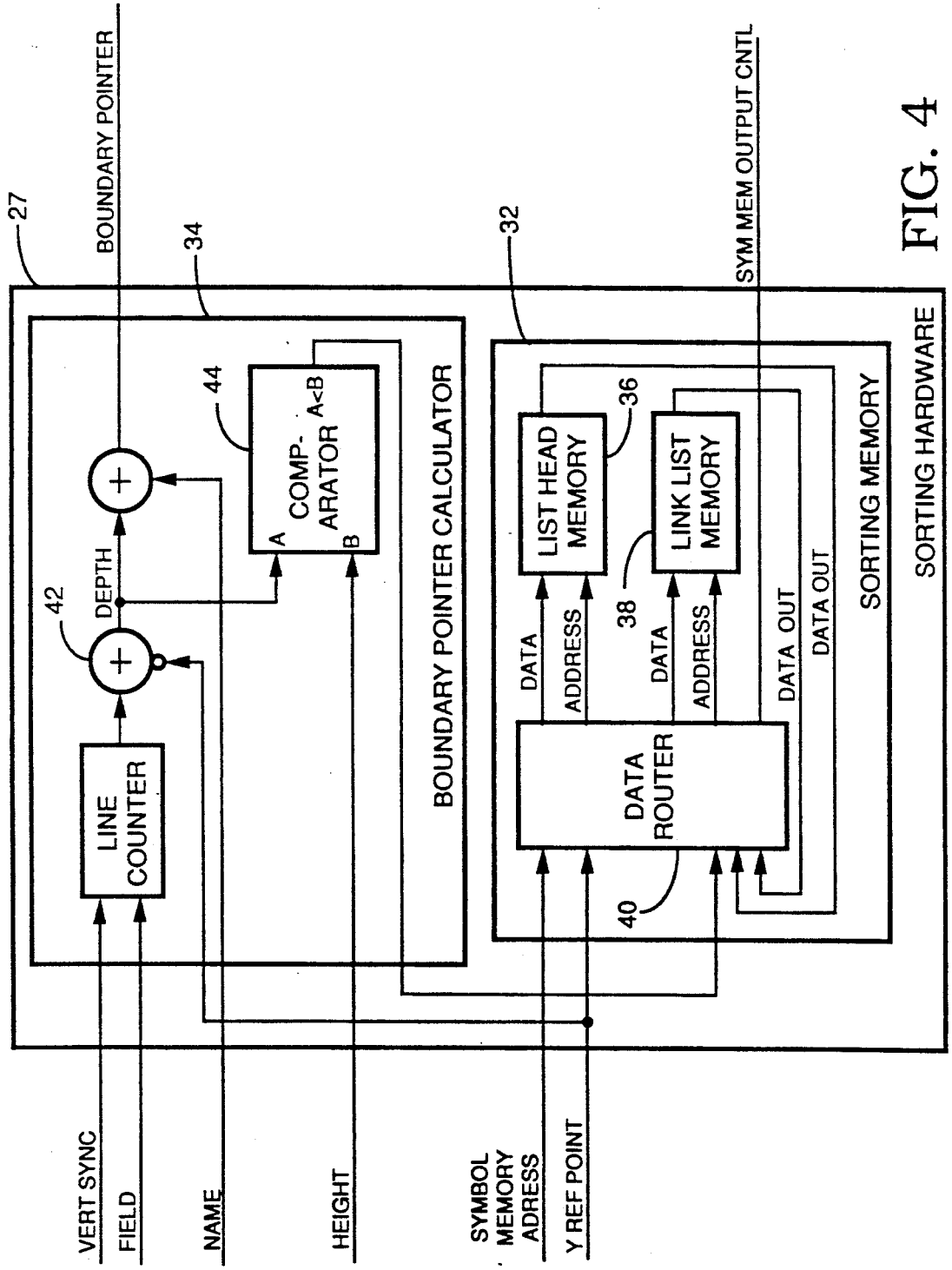
FIG. 4 is a more detailed drawing of the sorting hardware portion of the vertical sorter.

The sorting hardware 27 within similarly entitled sorting hardware 26 is shown in more detail in FIG. 4. This hardware includes a sorting memory 32 for accessing symbol memory 28 for each symbol included on a scan line and a boundary pointer calculator 34 for using those reference parameters to provide output numbers that point or lead to addresses in the boundary generator 16 that contain symbol parameters for that scan line. The sorting memory 32 is comprised of a list head memory 36, link list memory 38 and data router 40. Router 40 is comprised gating logic for transmitting signals along different selected paths as described below in response to receipt of appropriate control signals. Memories 36 and 38 are interconnected through router 40 to form a linked list or chain of addresses for each scan line of a display to the locations or registers of symbol memory 28 that contain the reference parameters for each symbol included on that scan line.

The interconnection or linked list of addresses to memory 28 may be best understood from FIGS. 5, 6 and 7. Each register of list head memory 36 in FIG. 5 represents one scan line of a television display. The numbers loaded into the registers of list head memory 36 define addresses of both the link list memory 38 in FIG. 6 and symbol memory 28 in FIG. 7. Entries in the link list memory 38 define addresses of both the symbol memory 28 and other addresses of the link list memory 38. As will be apparent hereinafter, this addressing scheme enables the two addressing registers to provide lists or change of addresses to however many symbols may be included on a scan line.

FIGS. 5, 6 and 7 show the initial entries in the registers of the sorting and symbol memories 32 and 28, respectively. Each register of the symbol memory 28 contains reference parameters for one symbol, namely the symbol name, height, and y coordinate of the selected reference location in a desired display. These entries need not be arranged or sorted in any particular order in memory 28. The vertical sorter 14 sorts symbol parameters without changing either the order or value of parameters in symbol memory 28. The register addresses in symbol memory 28 for each symbol are loaded into the register of the list head memory 36 that corresponds to the display scan line of the reference point location for that symbol. FIG. 5 represents the loading or entry for the display shown in FIG. 2. In FIG. 2, the reference point for symbol S1 is on scan line 1 and reference point for symbol S2 is on scan line 2. The addresses of these symbols in symbol memory 28 are therefore loaded into registers 1 and 2 respectively of list head memory 36.

The values of the entries in individual registers of the list head memory 36 and link list memory 38 are changed and updated during vertical sorting as follows. Only one address may be included in each individual register of memories 36 and 38. When additional symbols are placed on a line, the address already in the register of memory 36 for that scan line is forwarded to the address in link list memory 38 which is the same as the address in symbol memory 28 of the new entry added to list head memory 36. This forwarding of symbol addresses creates link lists for all symbols on each scan line. Zero entries in the list head memory 36 and link list memory 38 end the linked lists for the different scan lines. If there is a zero entry in a register of list head memory 36 when that register is reached during sorting, no entries will be read from symbol memory 28 for the scan line represented by that register. A zero in the link list memory 38 at the end of a chain of linked addresses ends read out of memory 28 for that scan line.

In operation, the sorting memory 32 provides the name, height, and y coordinate of the reference point for each symbol indicated by the linked list to be on a scan line to the boundary pointer calculator 34. Calculator 34 uses these numbers to provide boundary pointers to memory locations in boundary generator 16. The pointers for each symbol are equal to the depth or distance into the symbol of the line being scanned, plus symbol name. Depth is provided by summing element 42 which subtracts the y value or scan line of the symbol reference point from the instant scan line. If the depth is less than the symbol height or total number of scan lines of the symbol, comparator 44 provides an output to data router 40 which directs the router to add the address for that symbol to the linked list for the next line, or forward the entry to the next register of list head memory 36 and forward any prior entry to link list memory 38. For example, symbols S1 and S2 both appear on scan line 2 on FIG. 2. After completion of scan line 1, a 1 would be entered in register 2 of list head memory 36 and the 2 would be forwarded to register 1 of link list memory 38.

Boundary Generator

Boundary generator 16 is comprised of a boundary memory 50 for converting right boundary pairs for each symbol provided by the cpu to left/right coordinates sorted according to vertical position in an intended display. The boundary generator also includes a color scheme memory circuit 52 for providing color pointers or address numbers that are used as described hereinafter to identify addresses in the color palette 23 containing colors selected for each contour of symbols to be represented by the video output signal. The boundary generator 16 is illustrated by FIGS. 1, 8, 9, 10 and 11. The boundary memory 50 is comprised of an intersection list memory 54 that is loaded by the cpu with the bounding box boundary coordinate pairs, contour numbers and boundary descriptions parameters. The boundary description parameter include the width of each boundary and the start and end areas, or proportions of the first and last pixels intersected by each each boundary that are to the right of that boundary. Values of the start area and end area and width are not included in the tables of FIGS. 9, 10 and 11. These parameters have been explained above in relation to the discussion of cpu 12 and FIGS. 21 and 22. These parameters are better illustrated by those Figures than by a discussion of the corresponding values of start area, end area and width for symbols S1 and S2.

The parameters for each symbol are sorted by the cpu before they are supplied to the boundary generator and are loaded together in sorted order into consecutive registers or blocks of the intersection list memory 54. Different symbols can be loaded into memory 54 in any order so long as all entries for each symbol are kept together in defined block. The arrangement of the symbols in the intersection list memory need not, and generally will not represent any spatial or other sorting. Boundary parameters for each symbol are loaded into whatever memory sections are available as different symbols are added or deleted from the output signal. The parameters shown in FIGS. 10 and 11 are for the symbols S1 and S2 shown in FIGS. 18 and 19. The designation of the symbol and line ($S_xL_x$) shown in FIG. 11 has been provided for assistance in understanding the listed numerical values and do not represent data stored in the memory.

Figure 8:
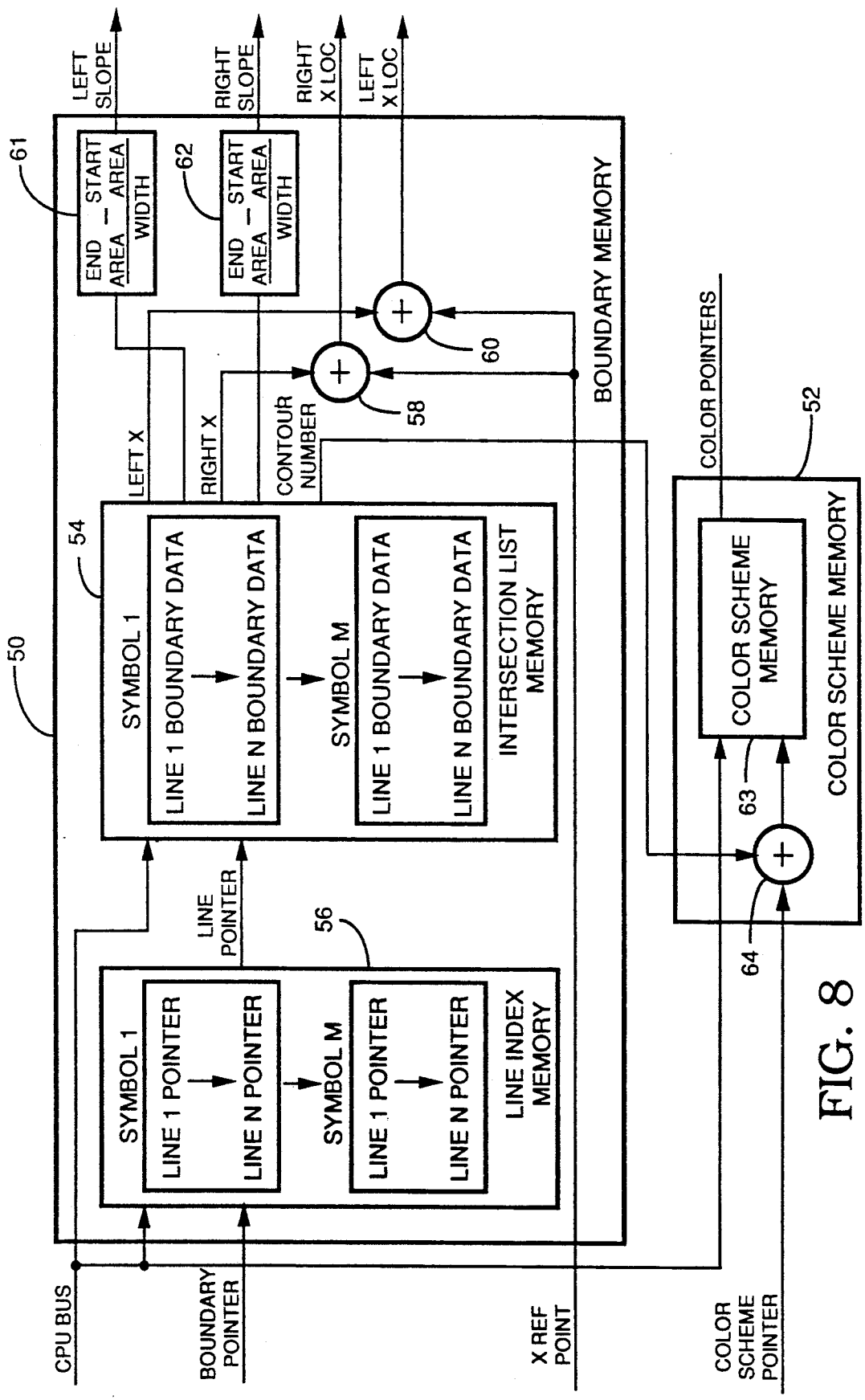
FIG. 8 is a block level diagram of the boundary generator stage of the symbol generator of FIG. 1.

Boundary memory 50 in FIG. 8 also includes a line index memory 56 for storing pointers or addresses to locations in the intersection list memory 54. The cpu, having read the y values of the bounding box coordinates loads one pointer for each line of a symbol into consecutive registers of the line index memory 56. These pointers identify the first address or register of intersection list memory containing boundary values for each line of a symbol. Symbol S1 of FIGS. 2 and 18 includes six lines and symbol S2 of FIGS. 2 and 19 includes four lines. The first six registers in line index memory 56 contain pointers to the registers containing the first entry for the six lines of symbol S1. Registers 7 through 10 of line index register 56 contain the addresses of the first entries for each line of symbol S2 in intersection list memory 54. The cpu 12 also presets a bit in the last entry for each line to control readout. In operation, vertical sorter 14 provides a sequence of addresses in scan line order to locations or registers of line index memory 56 that contain addresses to registers in intersection list memory 54 which contain the first set of parameters for each symbol on a given scan line. The x coordinates transmitted from the intersection list memory 54 are provided to summing elements 58 and 60 which add the x location of the reference point for each symbol to those coordinates to provide the x coordinate of each element in an intended display. The start area, end area, and width for the left and right boundaries are forwarded to divider circuits 61 and 62 respectively, which divide the value of the end area minus the start area by the width. This division determines the incremental change in the portions of consecutive pixels intercepted by each boundary that fall on the left side of that boundary. The start area, width and incremental area for each boundary segment are forwarded to the horizontal sorter 18 and subsequently used by the filler 20 to generate percentage area signals that are applied to provide anti-aliasing.

Color scheme memory circuit 52 in FIGS. 1 and 8 includes a memory 63 that is pre-loaded by the cpu with numbers determined by the color scheme desired by an operator, and a summing element 64 that adds the contour number for each boundary to the color scheme pointer number for that symbol received from symbol memory 30 of vertical sorter 14. The summed number provided by element 64 is an address number to color scheme memory 63 that determines the value of the output signal from memory 63. The color scheme memory 63 permits an operator to select a more complex color scheme and to change the color of a symbol more easily than if the summation signal provided by adder 64 were used directly to generate addresses to color palette 23 independent of memory 63.

Horizontal Sorter

Figure 12:
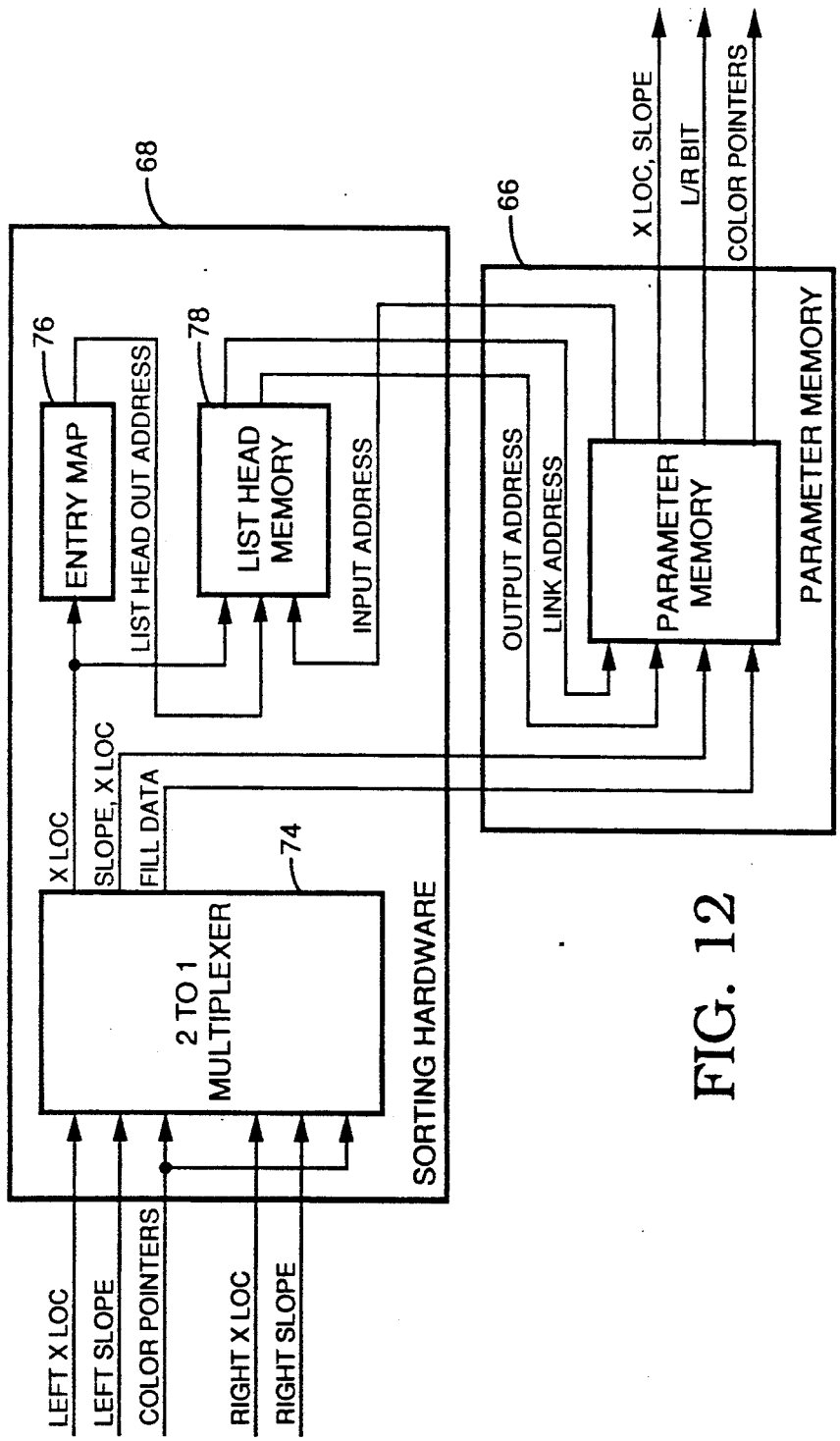
FIG. 12 is a schematic diagram of coordinate sorting hardware and a parameter memory, both of the horizontal sorter stage of the symbol boundary generator.
Figure 13:
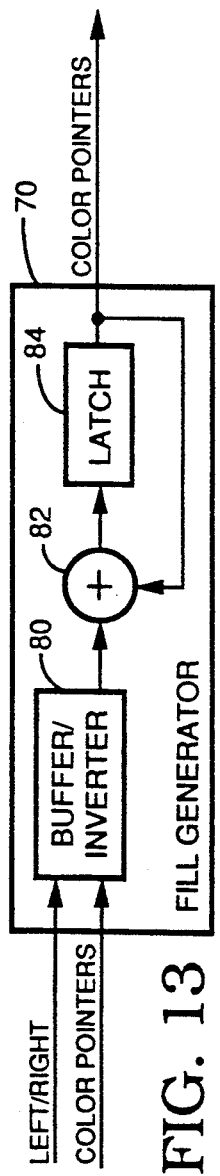
FIG. 13 is a schematic diagram of the fill generator element of the horizontal sorter.

The horizontal sorter 18 in FIGS. 1, 12 and 13 is comprised of a parameter memory 66 and sorting hardware 68 for sorting color pointer numbers according to position along each scan line or x axis value, a fill generator 70 for increasing the value of the color pointer at left boundaries and decreasing the value at right boundaries, and a boundary buffer 72 that stores the coordinate values and associated boundary description parameters provided by parameter memory 66, and the color pointers provided by fill generator 70 for each field for delay and presentation in the next field. This one field delay permits time averaging so that the generator can generate signals representing images that include more boundaries on some scan lines than can be processed in a television horizontal line interval.

FIG. 12 shows the parameter memory 66 and sorting hardware 68 of horizontal sorter 18. The sorting hardware includes a multiplexer 74 that receives left and right boundary coordinates from the boundary generator 16 and provides them to parameter memory 66, entry map memory 76 and list head memory 78. The left/right designation of boundaries recorded in parameter memory 66 is maintained by loading right boundaries into even registers and left boundaries into odd. Memory 76 and 78 each include one memory location for each display location or pixel of a scan line of a video display raster. Memory 76 is a bit memory. Each bit represents a corresponding address register in list head memory 78. A bit is set in map 76 for each boundary point, or set of parameter values for a boundary point that are loaded into parameter memory 66, that corresponds to the x location of that color pointer along a scan line. The location or register number of memory 66 that receives the color pointer is recorded in the location or register of memory 78 that corresponds to the bit that was set in memory 76.

The loading entry of signals into appropriate locations of memory 76 and 78 is accomplished by providing the x coordinate locations of the boundary points for all parameter values loaded into parameter memory 66 as addressing signals to entry map 76 and list head memory 78. The location or register of memory 66 containing the parameter values for that boundary point is provided to memory 78 along the link address channel illustrated in FIG. 12 as a data signal that is recorded at the list head address specified by the addressing signal or x coordinate of the boundary point. A rapid readout of parameters in scan line order is provided by scanning entry map 76. Each preset bit indexes the corresponding memory location in list head memory 78 which addresses the appropriate locations in parameter memory 66.

The fill generator 70 included in horizontal sorter 18 is shown in more detail in FIG. 13. Fill generator 70 is comprised of a buffer inverter 80, adder 82 and latch 84. The fill generator receives color pointers from parameter memory 66 and a bit that indicates whether the color number is for a left or right boundary. The inverter 80 inverts right boundaries. Latch 84 retains the output color pointers or address signals provided by the fill generator 70. Adder 82 applies color pointer numbers for left boundary points to increase the output signal provided by fill generator 70 and thus increase the register address of color palette 23 that is accessed at a left boundary point. Since color address numbers for right boundaries are inverted, each color pointer for a right boundary point reduces the output number provided by fill generator 70. When a right boundary point is reached the register address of palette 23 that is accessed is thus reduced. The summed output signals provided by fill generator 70 are transmitted to boundary buffer 72 which also receives the display coordinates associated with those address signals from parameter memory 66. The coordinate locations of address signals represent the locations of boundary points both on a raster display and also in the video signal to be provided by the generator 10. Zero values of the summed color pointer or address signal provided by fill generator 70 are data points and are provided to boundary buffer 72 the same as other signal values. Zeros represent the address in color palette 23 of the background color.

Boundary buffer 72 is a first-in first-out memory that retains signal values for one field, or in other words retains all values generated for a field before transmitting those values to filler 20. The coordinate locations of the summed address signals and other parameters for boundary points associated with those signals control the timing or readout of signals from buffer 72. Buffer 72 transmits the summed address signal and other parameters for each boundary point upon receipt of a control count equal to the coordinate location of the boundary point. In the system 10, the control count is provided by a pixel counter (not shown) included in color palette 23. The counter is responsive to external control signals for the overall video system, i.e. the pixel clock, horizontal sync and vertical sync signals that are generated external of the symbol generator 10 to control operation of generator 10 and all other devices used in combination with it such as a video display. The control counter in color palette 23 includes a pixel counter that is clocked by (reads) the external pixel clock and is reset by the horizontal sync signal, and a line counter that is clocked by the horizontal sync signal and reset by the vertical sync.

Filler

Figure 14:
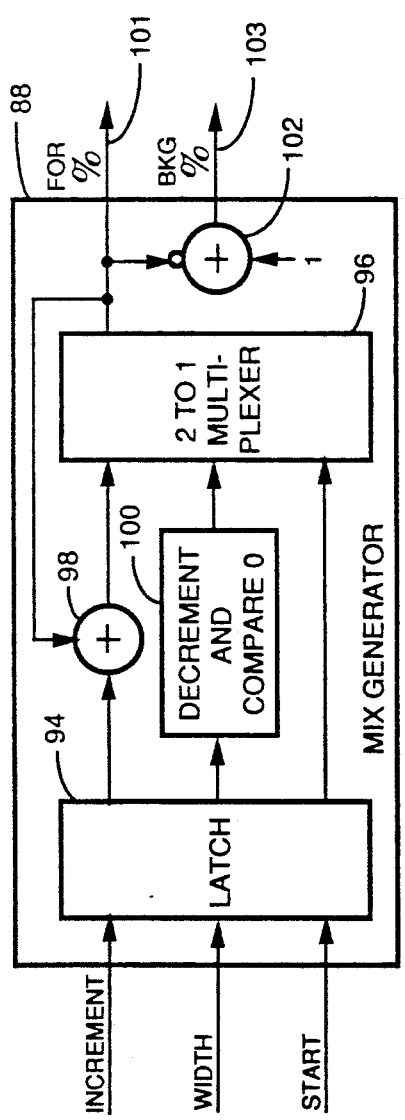
FIG. 14 is a block level diagram of a mix generator and a color select logic of the filler stage of the symbol generator of FIG. 1.

The filler 20 in FIGS. 1 and 14 is comprised of color select logic 86 and a mix generator 88. The color select logic 86 determines the transmission of color pointers or color address signals from boundary buffer 72 to color palette 23 and thus the values of the color signals provided by that palette. Mix generator 88 applies the boundary description parameters received from buffer memory 72 to generate output signals representing the areas or percentages of each pixel crossed by a boundary that are on opposite sides of that boundary. These percentage area signals determine the mix ratio proportions of different color signals combined into the portions of the output signal provided by the symbol generator 10 that represent symbol boundaries.

As shown in FIG. 14 in the color select logic 86 is comprised of two latches 90 and 92 connected in series. Latch 90 receives color address signals from boundary buffer 72 and maintains each received address as an output signal along line 93 to color palette 23. When a symbol boundary is reached and a new address signal is provided to latch 90, the prior value stored in that latch is forwarded to latch 92. At symbol boundaries, latch 90 thus provides an output pointer for the color value to the right of the value, and latch 92 provides an output color pointer for the area to the left of the boundary.

Mix generator 88 is comprised of a latch 94, a 2 to 1 margin edges multiplexor 96, a feedback loop to summer 98 and a control 100 for controlling increase of the signal provided to the multiplexor 96 for successive pixels. The latch 94 receives boundary description signals from buffer memory 72 for each boundary point or boundary location in the output video signal provided by the symbol generator 10. Latch 94 provides the start area and incremental area signals to multiplexor 96 and maintains those signals until receipt of new values for a subsequent boundary location from boundary memory 72. Multiplexor 96 provides the larger of these two received signals as an output signal along line 101. This signal indicates the foreground percentage or proportion of each pixel intercepted by a boundary disposed to the right of that boundary. A second percentage signal equal to the background area or portion of each pixel intercepted by a boundary that falls to the left of that boundary is provided over line 103 by a summing element 102 that subtracts the value of the foreground percentage signal from the total unit value or one. For each successive pixel crossed by a boundary, the incremental area from latch 94 is added to increase the value of the foreground area output signal provided multiplexor 96 and reduce the background area signal. Also, the value of the signal provided by control 100 is reduced by 1. When the last pixel along a scan line intercepted by a boundary is reached, the count in control 100 will be reduced to 0 and the control circuit provides an output to multiplexor 96 that blocks further change in the values of the output signals.

Mixer

Figure 15:
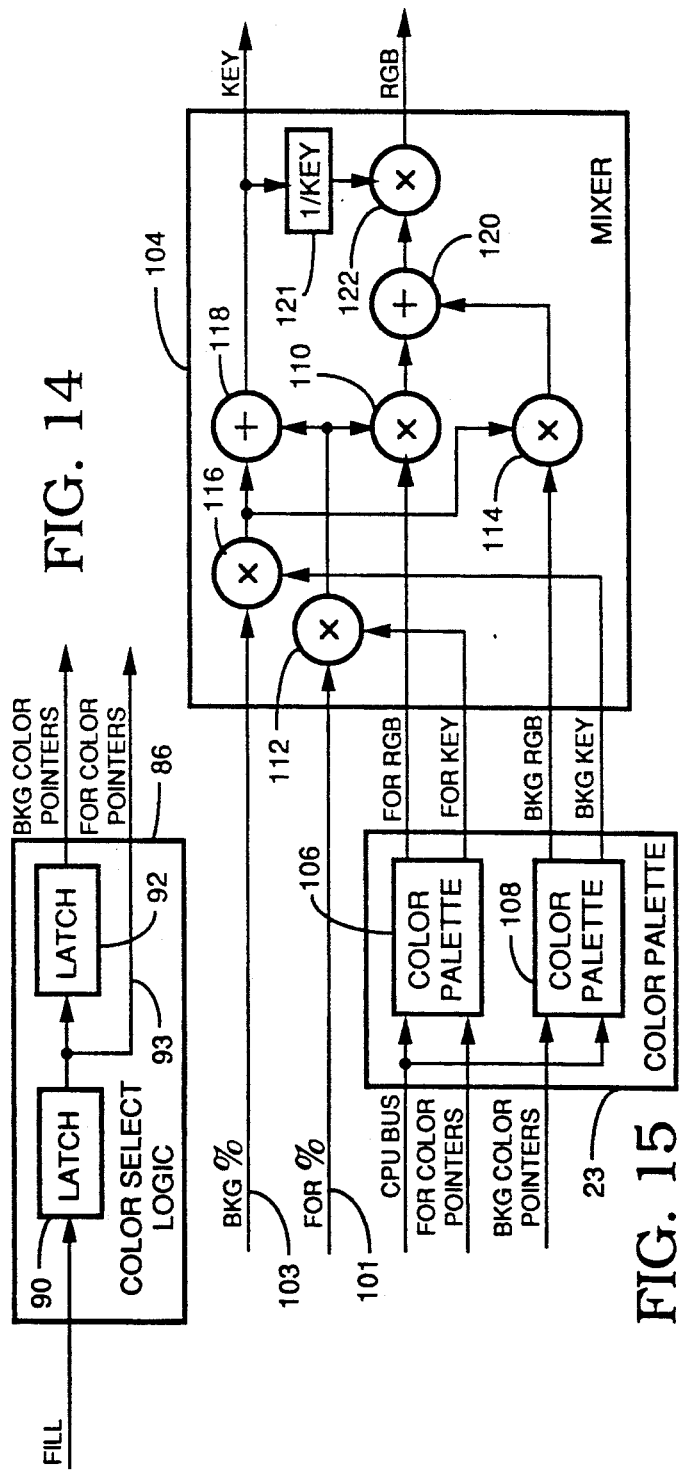
FIG. 15 is a block level diagram of a mixer and a color palette of the mixer stage of the symbol generator of FIG. 1.

The mixer stage 22 of the symbol generator 10 is comprised of a color palette section 23 for providing color signals having values determined by the values of received address signals, and a mixer 104 for combining color signals from palette section 23 to provide signals for symbol boundaries that are appropriate mixtures of the colors on opposite sides of those boundaries. These elements are shown in FIG. 15. The color palette portion 23 of the mixer 22 includes a first color palette 106 connected to receive address signals from latch 90 and a second palette 108 connected to receive address signals from latch 92. The color palettes 106 and 108 are color look-up tables or memories that are pre-loaded from the cpu with signal information in different addresses to provide output video data signals having RGB color and key values that an operator may want to include in the output video signal. Each palette includes a number of different memory locations. Each location contains four sets of eight bit registers, one each for red, green, blue, and a key signal. Values loaded into these individual registers determine the video signal provided when that location is accessed by an address signal provided to the color palette. The key signals are operator selected percentage signals that determine the opacity of the RGB signals. The key signals vary the signal levels of the RGB signals, or percentages of total available signal resource given to each RGB signal, so that the output video signal from the symbol generator 10 can be combined with other video signals by switchers or other devices to provide a composite signal for video display. A typical display may comprise, for example, text, characters, logos or other symbols defined by the signal provided by symbol generator 10 superimposed over a background scene.

The mixer 104 is comprised of multiplier elements 110 and 112 connected to multiply the foreground RGB signal provided by color palette 106 by the foreground key signal and foreground percent area signal provided by mix generator 88. Multiplying elements 114 and 116 are connected to multiply the background RGB signal provided by color palette 108 by the background key signal and background area signal provided by mix generator 88. A summing element 118 is connected to receive and provide a summed key signal comprised of the products of the percent area signals and key signals from multipliers 112 and 116. A second summing element 120 is connected to receive and add the RGB signals from multipliers 110 and 114 to provide a summed RGB symbol having the color value desired by an operator using the symbol generator 10.

For all portions of the video signal or video display other than symbol boundaries, the background area signal provided by mix generator 88 will be zero, and the signal provided by summing element 120 will be the signal provided by color palette 106. For symbol boundaries, the signal provided by summing element 120 will be an appropriate mixture of the color to the left of the boundary provided by palette 108 and the color to the right of the boundary provided by palette 106. Elements 121 and 122 are included in mixer 104 to divide this RGB signal by the summed key signal provided by adder 118 in order to accommodate the architecture of most standard switchers presently available that would likely be used to combine the signal provided by symbol generator 10 with other video signals. These elements divide the RGB signal by keys so that the composite signal provided by a switcher that receives and applies the RGB and key signals will have the appropriate desired value.

Overall System Operation

Figure 23:
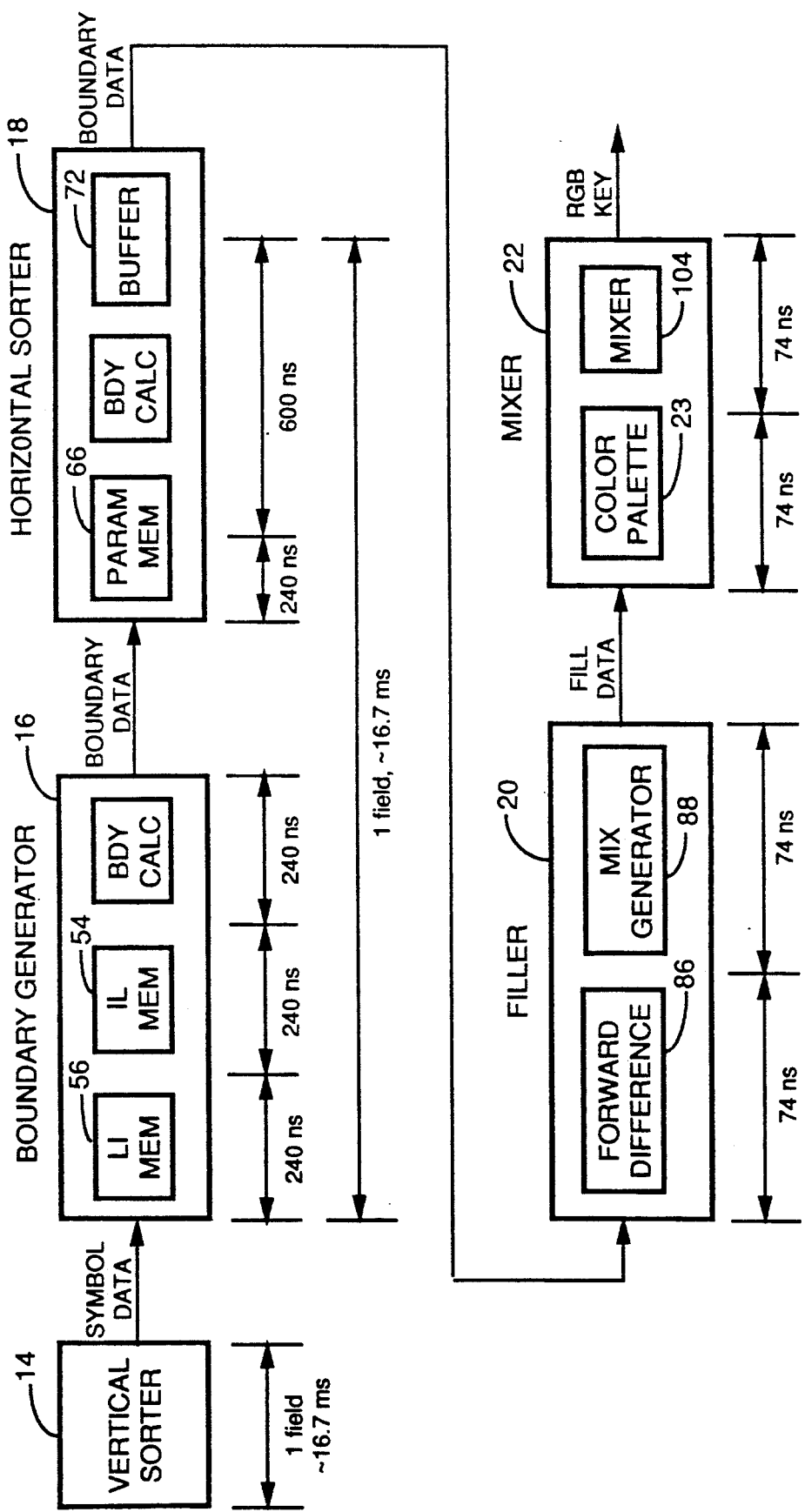
FIG. 23 is a timing diagram that shows an example of the time required for each stage of a specific embodiment of the symbol generator 10 to produce a video signal representing one field.

FIG. 23 illustrates the time required for operation of each of the pipeline stages discussed above and performance of each processing step for one video field in one preferred embodiment of the symbol generator 10. In the embodiment as illustrated in FIGS. 1, 3 and 23, symbol memory 24 of vertical sorter 14 is a 2K word double port memory (where the symbol K means one thousand so that 2K means two thousand) that permits simultaneous read and write operations. In boundary generator 16 of FIGS. 1, 8 and 23, intersection list memory 54 and line index memory 56 are both 1 Meg, or one million, word memories, and color scheme memory 63 is an 8K memory. In horizontal sorter 18 of FIGS. 1, 12, 13 and 23, parameter memory 66 is a 2K double buffered memory, and boundary buffer 72 is a 64K double buffered memory. The vertical sorter 14 sorts boundary points according to position in a display in 16.7 milliseconds (ms). In the boundary generator 16, readout of addresses to intersection list memory 54 from line index memory 56 is performed in 240 ns. Readout from the intersection list memory 54 occurs in additional 240 ns. The boundary calculations, which include determination of display coordinates by adding the reference point location for each symbol to the bounding box coordinates, determination of the incremental change in portions of consecutive pixels intercepted by a boundary that are disposed on the left side of that boundary and readout of an appropriate color scheme number from color scheme memory 63 occurs in 240 ns. In the horizontal sorter 18, symbols are read into appropriate locations in parameter memory 66 in 240 ns. Address numbers are established in entry map memory 76 and list head memory 78, and parameters read out to boundary buffer 72 in appropriate sorted order in 600 ns. In filler 20 in FIGS. 1, 14 and 23, color address signals are forwarded from latch 90 to latch 92 or forward differenced when a new symbol boundary is reached in 74 ns. Mix generator 88 applies area increments to change the percentage signals for areas on opposite sides of the boundary for each successive pixel in 74 ns. In mixer 22 in FIGS. 1, 15 and 23, each of the color palettes 106 and 108 of color palette 23 receive readout address commands and provide/change the RGB video data signals in 74 ns. Mixer 104 applies the percentage area signals and key signals to mix the RGB from the individual palettes 106 and 108 to provide a mixed RGB and summed key signal in 74 ns.

Having thus described embodiment of this invention, a number of modifications will be readily apparent to those skilled in the art. The functions performed by the specific devices described herein can be provided by other elements. For example, functions performed by software could be provided by hardware elements, and hardware functions can be performed by software. The different processing steps for providing anti-aliasing can be divided or distributed differently in different symbol generator systems and still obtain the benefits of a distributed processing approach. The different features and aspects of this invention can be incorporated into systems which differ from that shown and described in detail herein, and need not all be included in one system. Also, the scheme of this invention can be implemented in a black and white television embodiment. The term video color signal has been used in a broad sense to refer to the video data signal and includes both chrominance and luminance components.

What is claimed is:

1. A symbol generator for providing a video data signal representing selected symbols in which portions of said video data signal corresponding to discrete display locations of a display raster crossed by symbol boundaries have values intermediate values of said video data signal corresponding to areas entirely on different sides of said boundary comprising:

means for providing first and second video data signals having values representing areas entirely on opposite sides of a symbol boundary, means for determining proportions of a discrete display location of the display raster that is crossed by a symbol boundary with color values that are mixtures of colors on different sides of that boundary; and means for multiplying said video data signals representing areas entirely on different sides of said boundary by said proportions of said intercepted display location on said different sides of said boundary and combining resultant product signals to provide an output video data signal; and wherein said means for providing first and second video data signals including:

first and second look-up memory means for providing video data signals having values determined by values of address signals provided to said look-up memory means; and means for providing address signals which identify locations in said first and second look-up memory means containing video data signals representing areas entirely on opposite sides of a symbol boundary and wherein said means for providing address signals includes:

means for providing address signals corresponding to the boundaries of the selected symbols, means for sorting the boundary address signals in a sequence corresponding to the positions of symbol boundaries in the output video data signal; and signal selection logic means comprising first and second latch means for receiving and respectively for providing the respective ones of said sorted boundary address signals in said sequence to said first and second look-up memory means, said first and second latch means being connected in series such that receipt of a boundary address signal by said first latch means causes the boundary address signal then in said first latch means to be forwarded to said second latch means.

2. The symbol generator of claim 1 in which said means for providing said address signals comprises means for modifying consecutive values of each address signal in such a manner that a respective value of an address signal is increased for a left boundary of the respective symbols and decreased for a right boundary of the respective symbols.

3. The symbol generator of claim 2 in which said first and second look-up memory means comprise first and second color look-up palettes for providing video data signals having color values determined by the values of address signals provided to said color palettes.

* * * * *

UNITED STATES PATENT AND TRADEMARK OFFICE
CERTIFICATE OF CORRECTION

PATENT NO. : 5,153,937

DATED : October 6, 1992

INVENTOR(S) : James A. Wobermin and Kendall N. Fuhrman

It is certified that error appears in the above-identified patent and that said Letters Patent is hereby corrected as shown below:

In claim 1:
    Column 15, line 28, change "have", to --having--

Column 15, line 36, change "is crossed by", to --are on each side of--

Column 15, line 37, after "with", insert --different--

Column 15, lines 37 and 38, delete "that are mixtures of colors"

Column 15, line 42, change "said intercepted" to --an intercepted--

Column 16, line 16, delete "the" (second occurrence).

Signed and Sealed this

Twenty-sixth Day of October, 1993

Attest:

BRUCE LEHMAN

Attesting Officer      Commissioner of Patents and Trademarks